(12) United States Patent
Shiotsuki et al.

(10) Patent No.: US 7,884,148 B2
(45) Date of Patent: Feb. 8, 2011

(54) RESIN COMPOSITION, METHOD OF PRODUCING SAME, AND FOAM-INSULATED ELECTRIC WIRE

(75) Inventors: Keizou Shiotsuki, Settsu (JP); Eiji Fujita, Settsu (JP); Tatsuya Higuchi, Settsu (JP); Shouji Fukuoka, Settsu (JP); Takahiro Taira, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 1009 days.

(21) Appl. No.: 11/713,696

(22) Filed: Mar. 5, 2007

(65) Prior Publication Data

US 2007/0149671 A1    Jun. 28, 2007

Related U.S. Application Data

(62) Division of application No. 10/482,584, filed as application No. PCT/JP02/06379 on Jun. 26, 2002, now Pat. No. 7,241,826.

(30) Foreign Application Priority Data

Jun. 26, 2001    (JP) .............................. 2001-193456

(51) Int. Cl.
   *C08K 3/38*    (2006.01)
(52) U.S. Cl. .......................... 524/404; 524/80; 524/81; 524/544
(58) Field of Classification Search ................. 524/404, 524/80, 81, 544
   See application file for complete search history.

(56) References Cited

U.S. PATENT DOCUMENTS

| | | | |
|---|---|---|---|
| 3,072,583 A | | 1/1963 | Randa |
| 3,554,932 A | * | 1/1971 | Overcashier et al. .......... 521/76 |
| 4,650,815 A | * | 3/1987 | Namba et al. ................. 521/77 |
| 4,764,538 A | | 8/1988 | Buckmaster et al. |
| 4,877,815 A | | 10/1989 | Buckmaster et al. |
| 5,023,279 A | | 6/1991 | Buckmaster et al. |
| 5,229,094 A | * | 7/1993 | Clauss et al. ................ 423/331 |
| 5,614,319 A | * | 3/1997 | Wessels et al. .............. 428/379 |
| 5,945,478 A | * | 8/1999 | Buckmaster et al. ........ 524/650 |
| 6,372,870 B1 | * | 4/2002 | Kitahara et al. ............. 526/250 |

FOREIGN PATENT DOCUMENTS

| | | | |
|---|---|---|---|
| EP | 0 413 255 A2 | | 2/1991 |
| FR | 2527620 | | 12/1983 |
| FR | 2527620 A | * | 12/1983 |
| JP | 59-11340 | | 1/1984 |
| JP | 61-4504 | * | 1/1986 |
| JP | 61-53336 | | 3/1986 |
| JP | 61-53336 A | * | 3/1986 |
| JP | 63-24503 | | 2/1988 |
| JP | 63-110508 | | 5/1988 |
| JP | 1-149840 | * | 6/1989 |
| JP | 1-172431 | | 7/1989 |
| JP | 1-172431 A | * | 7/1989 |
| JP | 3-233815 | | 10/1991 |
| JP | 6-89166 | | 11/1994 |
| JP | 7-121999 | | 12/1995 |
| JP | 8-12796 | | 1/1996 |
| JP | 8-269221 | | 10/1996 |
| JP | 10-45931 | | 2/1998 |
| JP | 10-195216 | | 7/1998 |
| JP | 2000-72912 | | 3/2000 |
| JP | 2001-123011 | | 5/2001 |
| JP | 2001-205552 | | 7/2001 |

OTHER PUBLICATIONS

International Search Report for PCT/JP02/06379 dated Sep. 17, 2002.
English translation of International Preliminary Examination Report for PCT/JP02/06379 dated Mar. 31, 2003.

* cited by examiner

*Primary Examiner*—Peter D. Mulcahy
*Assistant Examiner*—Henry Hu
(74) *Attorney, Agent, or Firm*—Sughrue Mion, PLLC

(57) ABSTRACT

The present invention provides a resin composition containing a filler poor in affinity for fluororesins as uniformly dispersed therein and a method of producing such resin composition and, further, a resin composition containing, as fillers, a nucleating agent for foaming and suited for producing foamed moldings with fine foam cells uniformly distributed therein and a method of producing such resin composition as well as a foamed molding formed from either of such resin compositions. The present invention is related to a resin composition comprising a fluororesin (A) and a filler (X) low in affinity for said fluororesin (A), wherein the filler (X) has a d99 value of not more than 15 μm.

5 Claims, No Drawings

RESIN COMPOSITION, METHOD OF PRODUCING SAME, AND FOAM-INSULATED ELECTRIC WIRE

CROSS-REFERENCE TO RELATED APPLICATION

This application is a divisional of U.S. application Ser. No. 10/482,584 filed May 25, 2004, now U.S. Pat. No. 7,241,826 which is a 371 of PCT/JP02/06379 filed Jun. 26, 2002; the above-noted applications incorporated herein by reference in their entirety.

TECHNICAL FIELD

The present invention relates to a resin composition containing a filler having low affinity for fluororesins and a method of producing such resin composition, to a resin composition judiciously usable in producing foam-insulated electric wires and a method of producing such resin composition, and to a foamed molding obtained from the above-mentioned resin composition.

BACKGROUND ART

The effects of addition of a filler to fluororesins are greatly influenced by the morphology, particle diameter and chemical properties of filler particles. Generally, an improvement in filler dispersibility produces beneficial effects on mechanical strength characteristics, for example tensile strength, rigidity, and hardness. Further, an improvement in filler dispersibility is highly effective in producing improvements in thermal conductivity, chemical resistance, and workability, for instance.

For improving the dispersibility of a filler having low affinity for fluororesins, the filler is surface-modified, for example, by treatment with a silane coupling agent or by fluorination treatment to provide it with affinity for fluororesins.

However, such filler surface modification requires the use of a complicated equipment and, in addition, unfavorably results in an increase in filler production cost. Therefore, a method of uniformly dispersing, in fluororesins, a filler having low affinity for fluororesins without surface modification is demanded.

For example, conductive wires to be used for transmitting electronic signals are required to be isolated so that accurate transmission may be secured. Such isolation is realized, for example, by melting a resin and extruding it around a conductive wire to form a covering material. Judiciously used as such resin are fluororesins because of their being low in permittivity, lightweight and excellent in heat resistance, flame resistance and smokelessness, among others.

For attaining improvements in electrical characteristics, the covering material for conductive wires is desired to have a reduced permittivity. For reducing permittivity, it is effective to mold the covering material in a foamed moldings. Foamed moldings made from a resin are generally produced by foam molding, namely molding a molten resin while allowing a gas to be present therein. For obtaining foamed moldings uniform in shape and characteristics, it is desirable that the foam cells in the foamed moldings are fine and uniformly distributed.

For the purpose of rendering foam cells fine and uniformly distributed, there is a method known which comprises causing a nucleating agent for foaming to be present in resins so that the agent may form the origins for foam cell formation in the step of foam molding. Preferably used as the nucleating agent for foaming to be added to such resins as fluororesins is boron nitride (BN) since this is thermally stable, chemically inert and low in toxicity and has favorable electrical properties, for example it causes only slight changes in permittivity due to addition thereof.

As regards the technology of obtaining foamed moldings by incorporating BN as a nucleating agent for foaming in resins such as fluororesins, there are the following disclosures about BN, among others:

Japanese Kokai Publication Hei-8-12796 discloses that the combination of BN and zeolite is optimal among the combinations of ceramics or starting materials thereof with zeolite as nucleating agents for foaming.

Japanese Kokai Publication Sho-63-24503 and Japanese Kokai Publication Sho-63-110508 disclose methods which use BN as a nucleating agent for foaming.

Japanese Kokai Publication Sho-59-11340 discloses a method comprising adding BN having a surface area of 5 to 10 $m^2/g$ as a nucleating agent for foaming.

Japanese Kokoku Publication Hei-6-89166, U.S. Pat. No. 4,877,815 and U.S. Pat. No. 5,023,279 disclose the combined use of BN having a surface area of 8.6 $m^2/g$ with a sulfonic acid, a phosphonic acid or a salt thereof.

Japanese Kokoku Publication Hei-07-121999 and Japanese Kokai Publication (U.S. Pat. No. 4,764,538) disclose the combined use of BN having a surface area of about 8 $m^2/g$ with a thermally stable inorganic salt composed of a metal cation and a polyatomic anion and satisfying a certain relation, for example sodium tetraborate.

U.S. Pat. No. 3,072,583 discloses that the use of BN having an average particle diameter smaller than 10 μm is preferred in forming foamed fluororesin moldings and that the resin and BN is ground in an appropriate mill.

Japanese Kokai Publication Hei-10-195216 discloses a method which comprises mixing up a resin powder capable of foaming by decarboxylation, BN and a metal salt to give a blend, granulating the blend with a compactor and then with a hammer mill or a like grinder to give a powder, or pelletizing the blend with a pellet mill, and the pellets to an extruder and, according to the disclosure, the use of a Henschel mixer (product of Purnell International) is preferred in blending.

Japanese Kokai Publication Hei-10-45931 discloses a foaming method comprising using a processable fluorine-containing polymeric substance and BN in combination with a sulfonic acid or phosphonic acid or an acid salt thereof and/or a polyatomic-anion-containing inorganic salt, said BN having a form of crystals grown to a final size with an average particle size of not larger than 12 μm. It is described that this BN is prepared not by mechanical grinding of crushing individual crystals but by deagglomeration in case of occurrence of agglomeration of individual grown crystallites.

However, in any of these methods of obtaining foamed moldings by incorporating a nucleating agent in resins, there is no attention paid to the particle size distribution of the nucleating agent material or, further, to the particle size distribution of the nucleating agent in resin compositions.

These prior art technologies are not fully satisfactory in the existing circumstances in which a covering material further improved in electrical characteristics is demanded as a result of the increase in the volume of information to be transmitted at a time as resulting from the increase in the speed of communication owing to the recent advances in information-related technologies.

SUMMARY OF THE INVENTION

In view of the above-discussed state of the art, it is an object of the present invention to provide a resin composition containing a filler poor in affinity for fluororesins as uniformly dispersed therein and a method of producing such resin composition and, further, a resin composition suited for producing foamed moldings with fine foam cells uniformly distributed therein in case of containing, as the above-mentioned filler, a nucleating agent for foaming, a method of producing such resin composition as well as a foamed molding formed from either of such resin compositions.

The present invention provides a resin composition comprising a fluororesin (A) and a filler (X) low in affinity for the above-mentioned fluororesin (A) in which composition the filler (X) has a d99 value of not more than 15 μm.

The present invention also provides a resin composition comprising a fluororesin (A) and a nucleating agent (B) for foaming in which composition the nucleating agent (B) for foaming has a d99 value of not more than 15 μm.

The above-mentioned d99 value is preferably not more than 10 μm.

A variation in areas occupied by the nucleating agent (B) for foaming per a unit area in an arbitrary section is preferably not more than 15%.

The above-mentioned nucleating agent (B) for foaming is preferably boron nitride.

The nucleating agent (B) for foaming amounts to preferably 0.1 to 2% by weight of the above-mentioned resin composition.

The above-mentioned resin compositions are preferably allowed to be used in producing a foam-insulated electric wire.

The present invention further provides a resin composition producing method for producing the above resin composition which comprises (1) a step of grinding and/or classifying a filler, (2) a step of preparing a mixture from the above-mentioned filler and a fluororesin, (3) a step of kneading the mixture under applying a shearing force $S_1$ to thereby give pellets (I), and (4) a step of kneading the pellets (I) and a diluent resin under applying a shearing force $S_2$ to thereby give pellets (II) of a desired resin composition, said shearing force $S_2$ being not weaker than said shearing force $S_1$.

The present invention further provides a resin composition producing method for producing the above-mentioned resin composition which comprises (1) a step of grinding and/or classifying a nucleating agent for foaming, (2) a step of preparing a mixture from the nucleating agent for foaming and a fluororesin, (3) a step of kneading the mixture under applying a shearing force $S_1$ to thereby give pellets (I), and (4) a step of kneading the pellets (I) and a diluent resin under applying a shearing force $S_2$ to thereby give pellets (II) of a desired resin composition, said shearing force $S_2$ being not weaker than said shearing force $S_1$.

DETAILED DISCLOSURE OF THE INVENTION

In the following, the present invention is described in detail.

The resin composition according to the present invention comprises a fluororesin (A) and a filler (X) low in affinity for the fluororesin (A).

In the present specification, the above-mentioned fluororesin (A) means one derived from the fluororesin to be used as a starting material in carrying out the above-mentioned resin composition producing method according to the present invention. Thus, the fluororesin (A) is the one derived from the above-mentioned fluororesin to be used as a starting material and occurring in the resin composition according to the present invention after undergoing at least an operation of mixing with a filler in step (2) and kneading operations in step (3) and step (4).

In the present specification, the "filler (X) low in affinity for fluororesins" means a filler such that when it is scattered on the liquid surface of a perfluoropolyether oil, the time required for it to sink to the level 1 cm lower than the surface level (hereinafter referred to as "sedimentation time") is 15 to 150 seconds.

If it takes 15 seconds or longer to occur the sedimentation of the filler (X), that will form lumps which can be detected by visual observation. The above-mentioned sedimentation time is the time required for the first one grain to sink by 1 cm.

The sedimentation time is measured by the following method.

An amount of 50 ml, accurately measured, of a commercial perfluoropolyether oil (S-65, product of Daikin Industries) is placed in a 50-ml glass beaker (body outside diameter 46 mm ø, total height 61 mm), and 0.05 g±0.005 g of the sample is scattered over the liquid surface. The time required for scattering should be not longer than 5 seconds. After completion of the scattering, timing is immediately carried out using a stopwatch, and the time required for the sample to sink to the level lower by 1 cm from the liquid surface of the perfluoropolyether oil is determined as the sedimentation time.

The above-mentioned filler (X) is not particularly restricted but includes, among others, graphite, carbon fiber, coke, silica, alumina, titanium oxide, zinc oxide, magnesium oxide, tin oxide, zinc oxide, antimonyoxide, calcium carbonate, magnesium carbonate, glass, talc, mica, isiglass, boronnitride, aluminum nitride, and calcium phosphate. The shape of the filler (X) is not particularly restricted but may be fibrous, needle-like, powdery, granular, or bead-like, for instance.

The filler (X) is the one having d99 value of not more than 15 μm in the state of distribution in the resin composition according to the present invention. When it is more than 15 μm, the fine particles of the filler (X) contained in the resin composition are relatively large and lack uniformity, so that the moldings obtained from the resin composition tend to lack uniformity in shape, in particular in thickness. A d99 value of not more than 10 μm is preferred.

The resin composition according to the present invention is thus almost free of coarse filler (X) particles. Therefore, while the conventional resin compositions contain, as fillers, agglomerates of 50 to 100 μm in diameter, for instance, the resin composition according to the present invention can give moldings containing the fine particles of the filler (X) in a condition finely divided and uniformly distributed.

The above-mentioned filler (X) preferably has a d50 value of not more than 5 μm. When the d50 value exceeds 5 μm, the moldings obtained tend to lack uniformity in shape, for example thickness. A value not more than 3 μm is more preferred.

In the present specification, the above-mentioned d99 and d50 values are determined by the following method. First, the resin composition according to the present invention is prepared in the form of pellets by the resin composition producing method mentioned later herein, and specimen pellets are sliced to a thickness of about 10 μm by using a microtome.

The specimen obtained are observed under any of various optical microscopes at a magnification of about 500 to 3,000.

The images observed are subjected to image processing, and a histogram is constructed for the particle areas of the above-mentioned filler (X). On the histogram obtained, additions are made successively from the smallest particle area range to give a distribution function. The particle diameters at which the distribution functions correspond to 50% and 99% are recorded as d50 and d99, respectively.

The above-mentioned filler (X) is the one derived from a filler to be used as a starting material in the resin composition producing method according to the present invention and occurring in the resin composition according to the present invention after undergoing at least operations of mixing and kneading with the fluororesin to be used as a starting material, as mentioned hereinabove. Therefore, the above-mentioned filler (X) may be the same as fillers to be used as a starting material or one resulting from modification, mainly physical modification, in an operation of mixing or kneading according to the conditions of the mixing or kneading.

The above-mentioned filler (X) preferably amounts to 0.05 to 30% by weight of the resin composition according to the present invention. At levels lower than 0.05% by weight, it will be difficult to obtain particles finely divided and uniformly distributed in obtained moldings and, at levels exceeding 30% by weight, fine particles of the filler (X) will agglomerate with one another due to an increase in the level, making it difficult to obtain moldings containing finely divided and uniformly distributed fine particles of the filler (X). A more preferred lower limit is 0.1% by weight, and a more preferred upper limit is 25% by weight.

The fluororesin (A) contained in the resin composition according to the present invention shows a sufficiently low melt viscosity at a temperature at or above the melting point of each resin so that an ordinary plastics processing method such as melt extrusion or injection molding may be employed. For example, it has a melt flow rate of about 0.5 to 40 g/10 minutes as measured at an arbitrary temperature within the range of 200 to 400° C. under a load of 5 kg. It is necessary that the fluororesin (A) is melt processable.

As mentioned above, the fluororesin (A) is the one derived from the fluororesin to be used as a starting material in the resin composition producing method of the present invention and occurring in the resin composition according to the present invention after undergoing at least operations of mixing and kneading with the filler as a starting material. Therefore, the fluororesin (A) may be the same as the fluororesin to be used as a starting material or one resulting from modification, mainly physical modification, in an operation of mixing or kneading according to conditions of the mixing or kneading operation.

The fluororesin to be used as a starting material generally retains its melt processability in the above-mentioned operations of mixing and kneading. Therefore, it is not particularly restricted but may be any of the melt processable ones. For example, there may be mentioned the fluororesins mentioned later herein by way of example referring to the resin composition containing the nucleating agent (B) for foaming, and the like.

The monomer composition of the above-mentioned fluororesin to be used as a starting material may comprise another monomer or the like within a content range not impairing the properties intrinsic in each fluororesin. The other monomer is not particularly restricted but includes those mentioned later herein by way of example referring to the resin composition containing the nucleating agent (B) for foaming, among others.

The above-mentioned fluororesin to be used as a starting material can be synthesized by polymerizing a monomer composition in the conventional manner of any polymerization, for example emulsion polymerization, suspension polymerization, solution polymerization, bulk polymerization or vapor phase polymerization. In the polymerization reaction, a chain transfer agent such as methanol may be used.

The resin composition according to the present invention may contain, together with the fluororesin (A), another thermoplastic resin. The other thermoplastic resin is not particularly restricted but includes those mentioned later herein by way of example referring to the resin composition containing the nucleating agent (B) for foaming.

The resin composition according to the present invention may contain, together with the filler (X), the fluororesin (A) and the other thermoplastic resin to be used according to need, a further component(s), such as an additive(s).

The resin composition according to the present invention preferably has a structure such that the fine particles of the above-mentioned filler (X) are uniformly or substantially uniformly distributed in the matrix constituted of the fluororesin (A) and so on.

That the fine particles of the above-mentioned filler (X) are uniformly or substantially uniformly distributed in the matrix constituted of the fluororesin (A) and so on can be exemplified, for example, by the fact that when a plurality of arbitrary sections of the resin composition are taken, they show a small variation in the areas occupied by the above-mentioned filler (X) per a unit area.

Thus, the above-mentioned resin composition is preferably such one that a variation in areas occupied by the above-mentioned filler (X) per a unit area in an arbitrary section is not more than 15%, more preferably not more than 12%, still more preferably not more than 10%. At least 200 sections should be prepared and submitted to the above measurement. The value of the area occupied by the above-mentioned filler (X) is the total area occupied by the each fine particle of the above-mentioned filler (X) in each unit area.

The value of the areas occupied by the above-mentioned filler (X) per a unit area can be readily determined, for example, by slicing the pellets (II) comprising the above resin composition at arbitrary sites to a thickness of about 10 μm by using a microtome or the like, optically observing the specimens obtained at a magnification of about 500 to 3,000, and subjecting the observation images obtained to image processing.

The variation in the areas occupied by the filler (X) per a unit area in an arbitrary section is calculated according to the formula (I) given later following measurements of the values of the areas occupied by the filler (X) per a unit area in the above-mentioned plurality of sections.

A nucleating agent (B) for foaming can be judiciously used as the above-mentioned filler (X).

Thus, the resin composition according to the present invention may comprise the fluororesin (A) and the nucleating agent (B) for foaming.

In the present specification, the fluororesin (A) means the one derived from the fluororesin to be used as a starting material for the above-mentioned resin composition producing method according to the present invention. Thus, the fluororesin (A) is the one derived from the fluororesin to be used as a starting material and occurring in the resin composition according to the present invention after undergoing at least an operation of mixing with the nucleating agent for foaming in step (2) and kneading operations in step (3) and step (4).

The nucleating agent (B) for foaming is included in the definition of the above-mentioned filler (X).

In the present specification, the nucleating agent (B) for foaming means the one derived from the nucleating agent for foaming to be used as a starting material in the resin composition producing method of the present invention. Thus, the nucleating agent (B) for foaming is the one derived from the nucleating agent for foaming to be used as a starting material and occurring in the resin composition according to the present invention after undergoing at least an operation of mixing with the above-mentioned fluororesin in step (2) and kneading operations in step (3) and step (4).

The resin composition according to the present invention can give foamed moldings by melting the fluororesin (A) with the nucleating agent (B) for foaming dispersed therein, and then allowing a gas to be present in the obtained molten resin, followed by conducting foam molding with forming foam cells from origins occurred by the nucleating agent (B) for foaming.

Thus, the nucleating agent (B) for foaming can be present in the molten fluororesin (A) and function as origins of foam cell formation at foam molding of the above-mentioned molten fluororesin (A) while allowing a gas to be present therein.

The material of the nucleating agent (B) for foaming is not particularly restricted but any of those capable of providing origins of foam cell formation at foam molding, includes, for example, boron nitride, talc, sericite, diatomaceous earth, silicon nitride, fine silica, alumina, zirconia, powdered quartz, kaolin, bentonite, and titanium oxide. Among them, boron nitride is preferred since it can cause formation of fine and uniformly distributed foam cells and, further, it is excellent in heat stability, chemical stability, electrical properties, discoloration resistance, and nontoxicity, among others.

The nucleating agent (B) for foaming is the one having d99 of not more than 15 μm in the state of distribution in a resin composition. When the value exceeds 15 μm, the foam cells in the foamed moldings obtained will be relatively large and lack uniformity, so that the foamed moldings obtained may lack uniformity in forms such as their thickness, for instance, or decreases or lack of uniformity in capacitance may result, causing deterioration in electrical characteristics, or the characteristics of the foamed moldings, for example heat insulation properties, may deteriorate. A value of not more than 10 μm is preferred.

The resin composition according to the present invention is thus almost free of coarse particles as the nucleating agent (B) for foaming. Therefore, the resin composition according to the present invention can give foamed moldings containing fine foam cells uniformly distributed therein while the conventional resin compositions for forming foamed moldings which give foamed moldings containing a nucleating agent for foaming in the form of agglomerates of 50 to 100 μm in the particle diameter, for instance, and, as a result, having relatively large foam cells and lacking in uniformity of foam cell distribution.

The nucleating agent (B) for foaming preferably has a d50 value of not more than 5 μm. When the d50 value exceeds 5 μm, the foamed moldings obtained may contain relatively large foam cells, their electrical characteristics, such as permittivity and capacitance, and the characteristics as foamed moldings, such as heat insulating properties, may deteriorate. A value not more than 3 μm is more preferred.

In the present specification, the above-mentioned d99 and d50 values are determined by the following method. First, the resin composition according to the present invention is prepared in the form of pellets by the resin composition producing method mentioned later herein, and specimen pellets are sliced to a thickness of about 10 μm by using a microtome. The specimen obtained are observed under any of various optical microscopes at a magnification of about 500 to 3,000.

The images observed are subjected to image processing, and a histogram is constructed for the particle areas of the nucleating agent (B) for foaming. On the histogram obtained, additions are made successively from the smallest particle area range to give a distribution function. The particle diameters at which the distribution functions correspond to 50% and 99% are recorded as d50 and d99, respectively.

The above-mentioned nucleating agent (B) for foaming is the one derived from the nucleating agent for foaming to be used as a starting material in the resin composition producing method according to the present invention and occurring in the resin composition according to the present invention after undergoing at least operations of mixing and kneading with the fluororesin to be used as a starting material. Therefore, the nucleating agent (B) for foaming may be the same as the nucleating agent for foaming to be used as a starting material or one resulting from modification, mainly physical modification, in an operation of mixing or kneading according to conditions of the mixing or kneading.

The nucleating agent (B) for foaming preferably amounts to 0.1 to 2% by weight of the resin composition according to the present invention. At levels lower than 0.1% by weight, it will be difficult to obtain fine foam cells in foamed moldings and, at levels exceeding 2% by weight, foam cells will unite with one another due to an increase in their level, making it difficult to obtain fine foam cells abundantly and uniformly.

The fluororesin (A) to be contained in the resin composition according to the present invention has a sufficiently low melt viscosity at a temperature at or above the melting point of each resin so that an ordinary plastics processing method such as melt extrusion or injection molding may be employed. For example, it has a melt flow rate of about 0.5 to 40 g/10 minutes as measured at an arbitrarily selected temperature within the range of 200 to 400° C. under a load of 5 kg. The above-mentioned fluororesin (A) is preferably one capable of applying foam molding techniques currently in common use. Since the current foam molding techniques generally involve causing foam cell formation in the resin to give foamed moldings, it is necessary that the fluororesin (A) is melt processable.

As mentioned above, the fluororesin (A) is derived from the fluororesin to be used as a starting material in the resin composition producing method of the present invention and occurs in the resin composition according to the present invention after undergoing at least operations of mixing and kneading with a nucleating agent for foaming as a starting material. Therefore, the fluororesin (A) may be the same as the fluororesin to be used as a starting material or one resulting from modification, mainly physical modification, in an operation of mixing or kneading according to conditions of the mixing or kneading.

The above-mentioned fluororesin to be used as a starting material is not particularly restricted but may be any of those which are melt processable, since the melt processability is generally retained in the above-mentioned operations of mixing and kneading. Thus, it includes, among others, tetrafluoroethylene-hexafluoropropylene copolymers [FEPs], tetrafluoroethylene-fluoro(alkyl vinyl ether) copolymers, tetrafluoroethylene-ethylene copolymers [ETFEs], chlorotrifluoroethylene-ethylene copolymers [ECTFEs], poly(vinylidene fluoride) [PVdF], polychlorotrifluoroethylene [PCTFE], tetrafluoroethylene-vinylidene fluoride copolymers [VTs], poly(vinyl fluoride) [PVF], tetrafluoroethylene-vinylidene fluoride-chlorotrifluoroethylene copolymers [VTCs], and tetrafluoroethylene-ethylene-hexafluoropropylene copolymers.

The fluoro(alkyl vinyl ether) [PAVE], which is a comonomer for the tetrafluoroethylene-fluoro(alkyl vinyl ether) copolymers, is not particularly restricted but includes, among others, perfluoro(methyl vinyl ether) [PMVE], perfluoro(ethyl vinyl ether), and perfluoro(propyl vinyl ether) [PPVE]. In particular, those copolymers obtained by using PPVE are known by the name PFAs. Those comonomers may be used singly or two or more of them may be used in combination. When PMVE is used, poor crack resistance will result, hence PPVE is preferably used in combination.

Perfluororesins are preferred since they have good electrical characteristics. Among them, PFAs and FEPs are preferred. When the above-mentioned fluororesin to be used as a starting material is a copolymer, the content of each comonomer is not particularly restricted.

The above-mentioned fluororesin to be used as a starting material may also comprise, as the monomer composition, another monomer or the like within a content range not impairing the properties intrinsic in each fluororesin. The other monomer is not particularly restricted but may be selected from among tetrafluoroethylene, hexafluoropropylene, perfluoro(alkyl vinyl ether), perfluoroalkylethylene, perfluoro(alkyl allyl ether), and the like. The perfluoroalkyl group constituting the above-mentioned other monomer is preferably one containing 1 to 10 carbon atoms.

The above-mentioned fluororesin to be used as a starting material can be synthesized by polymerizing a monomer composition in the conventional manner of polymerization, for example emulsion polymerization, suspension polymerization, solution polymerization, bulk polymerization or vapor phase polymerization. In the polymerization reaction, a chain transfer agent such as methanol may be used in some instances.

The resin composition according to the present invention may contain, together with the fluororesin (A), another thermoplastic resin. The other thermoplastic resin is not particularly restricted but includes, among others, general-purpose resins such as polyethylene resins, polypropylene resins, vinyl chloride resins, and polystyrene resins; and engineering plastics such as nylons, polycarbonates, polyetheretherketone resins, and polyphenylene sulfide resins.

The resin composition according to the present invention may contain, together with the nucleating agent (B) for foaming, the fluororesin (A) and the other thermoplastic resin to be used according to need, a further component(s), such as an additive(s).

The other component mentioned above is not particularly restricted but includes, among others, fillers such as fibrous glass, glass powders, and asbestos fibers, reinforcing agents (material(s)), stabilizers, lubricants, pigments, and other additives. The other component further includes inorganic salts such as sodium, potassium and calcium tetraborates; sodium carbonate, lithium carbonate, potassium sulfate, and so forth.

The other component may also be a sulfonic or phosphonic acid or a salt thereof, and such acid or salt includes free acid and salt forms of totally or partially fluorinated aliphatic sulfonic and phosphonic acids optionally having cycloalkyl groups and/or ether oxygens as well as free acid and salt forms of aromatic sulfonic and phosphonic acids whose aromatic ring may optionally have a substituted alkyl, fluorine-containing alkyl and/or hydroxyl group(s).

The resin composition according to the present invention preferably has a structure such that the fine particles of the nucleating agent (B) for foaming are uniformly or substantially uniformly distributed in the matrix constituted of the fluororesin (A) and so on. When the fine particles of the nucleating agent (B) for foaming are distributed in that manner, foamed moldings with foam cells distributed uniformly therein can readily be obtained as a foamed molding as obtained from the above resin composition.

That the fine particles of the nucleating agent (B) for foaming are uniformly or substantially uniformly distributed in the matrix constituted of the fluororesin (A) and so on can be exemplified, for example, by the fact that when a plurality of arbitrary sections of the resin composition are taken, they show a small variation in the areas occupied by the nucleating agent (B) for foaming per a unit area.

Thus, the above-mentioned resin composition is preferably such one that the variation in the areas occupied by the nucleating agent (B) for foaming per a unit area in an arbitrary section is not more than 15%, more preferably not more than 12%, still more preferably not more than 10%. At least 200 sections should be prepared and submitted to the above measurement. The value of the area occupied by the nucleating agent (B) for foaming is the total area occupied by each fine particle of the nucleating agent (B) for foaming in each unit area.

The value of the area occupied by the nucleating agent (B) for foaming can readily be determined, for example, by slicing the pellets (II) comprising the above resin composition at arbitrary sites to a thickness of about 10 µm by using a microtome or the like, optically observing the sections obtained at a magnification of about 500 to 3,000, and subjecting the observation images obtained to image processing.

The variation in the areas occupied by the nucleating agent (B) for foaming per a unit area in an arbitrary section is calculated according to the formula (I) given below following measurements of the above-mentioned values of the areas occupied by the nucleating agent (B) for foaming per a unit area in plurality of the above-mentioned sections. The measured values obtained by the above-mentioned method are designated by $x_1, x_2, \ldots x_n$, and the mean of these measured values is represented by $\mu$.

$$\text{var.} = \frac{\sqrt{\sum_{\lambda=1}^{n}(x\lambda - \mu)^2/(n-1)}}{\mu} \times 100(\%)$$

The resin composition producing method of the present invention is intended to produce the above resin composition of the present invention and comprises (1) a step of grinding and/or classifying a filler, (2) a step of preparing a mixture from the filler and a fluororesin, (3) a step of kneading the mixture under applying a shearing force $S_1$ to thereby give pellets (I), and (4) a step of kneading the above-mentioned pellets (I) and a diluent resin under applying a shearing force $S_2$ to thereby give pellets (II) of a desired resin composition, said $S_2$ being not weaker than the shearing force $S_1$.

The above-mentioned filler in the resin composition producing method of the present invention is the one derived from the filler (X) low in affinity for the fluororesin (A), as mentioned hereinabove referring to the resin composition according to the present invention.

The grinding is preferably carried out until the average particle diameter of the filler becomes 5 µm or smaller. When the grinding is conducted down to 3 µm or smaller, the preparation of the resin composition according to the present invention becomes relatively easy in certain instances. On the other hand, even when an average particle diameter smaller than 0.5 µm is obtained by grinding, no remarkable effect can be confirmed on the difficulty in commercial practice. A preferred lower limit to the average particle diameter of the above-mentioned filler after grinding is 0.5 µm, a more preferred lower limit is 1 µm, and a preferred higher limit is 3 µm.

The above-mentioned grinding is preferably performed by a method such as to give, to the resulting filler, an average particle diameter within the above-mentioned range. More specifically, it is carried out while properly selecting the grinding machine and/or grinding conditions. Usable as the grinding machine are, for example, jet mills, hammer mills, ball mills, and pin mills. The filler having an average particle diameter within the above-mentioned range can also be prepared by classification.

In the above-mentioned step (2), a mixture is prepared from the filler obtained in the above-mentioned step (1) and a fluororesin. In the above-mentioned step (2), the above-mentioned filler and the above-mentioned fluororesin are premixed prior to pelletization in the succeeding step (3).

The above-mentioned fluororesin is the one already described hereinabove as the fluororesin to be used as a starting material in the resin composition producing method of the present invention and to serve as the material of the above-mentioned fluororesin (A) in the resin composition according to the present invention.

The method of mixing for obtaining the above mixture may be, for example, any of the methods known in the art. Since, however, the above-mentioned filler to be subjected to mixing is prepared in the above step (1) in the form of fine particles relatively small in average particle diameter, hence relatively large in surface area and therefore shows a general tendency toward agglomeration, a mixing method which hardly causes agglomeration of the above-mentioned filler is preferred.

When such mixing is attempted by placing the filler and the fluororesin in a container, such as a polyethylene bag, and shaking the whole, as disclosed in Japanese Kokai Publication Hei-10-45931, for instance, the resulting mixture will contain coarse particles relatively large in the particle diameter, for example with a d99 value exceeding 15 µm, due to the tendency of the filler toward agglomeration, resulting in lack of uniformity in distribution and in unsatisfactory mixing. Such mixture makes it difficult to obtain a resin composition containing the fine particles of the filler (X) finely divided and uniformly distributed therein, hence is not preferred.

As the above-mentioned method of mixing in the practice of the present invention, there may be mentioned the method comprising using a Henschel mixer, ribbon mixer, V blender, ball mill or the like. For inhibiting the above-mentioned filler from agglomerating to thereby prevent coarse particles relatively large in the particle diameter from being contained and to improve the uniformity in distribution, a method involving mechanical stirring, for example the use of a Henschel mixer, is preferred.

In the above-mentioned step (3), pellets (I) are conducted by kneading a mixture obtained in the above-mentioned step (2) under applying a shearing force $S_1$.

The pellets (I) are sometimes called masterbatch pellets.

The method of kneading under the shearing force $S_1$ is not particularly restricted but, generally, the kneading can be conducted by the method comprising using a melt kneader known in the art, for example a single-screw extruder or a twin-screw extruder.

The above-mentioned shearing force $S_1$ can be adjusted by the use of an appropriate melt kneader and by selecting the operation conditions such as kneading temperature and number of revolutions. When a twin-screw extruder is used, for instance, the shearing force $S_1$ can be adjusted by adjusting the extrusion temperature, extrusion amount, and screw revolution speed, among others, or selecting an appropriate screw segment constitution.

In the above-mentioned step (4), both the pellets (I) obtained in the above step (3) and a diluent resin are kneaded up under applying a shearing force $S_2$ to thereby give pellets (II).

The pellets (II) are sometimes called premix pellets.

In the present specification, the above-mentioned "diluent resin" means a melt-processable resin not containing the above-mentioned filler (X). The diluent resins are preferably ones of the fluororesin mentioned above or some other thermoplastic resin. It may be the same fluororesin to be used in the above step (2) or a different fluororesin. As the other thermoplastic resin, there may be mentioned, for example, the same ones as those other thermoplastic resins described already as the ones which may be contained in the resin composition according to the present invention. The same fluororesin as the one used in the step (2) is preferred as the diluent resin, however.

In attaining the total level of the above-mentioned fluororesin and the above-mentioned diluent resin in the pellets (II), they are not compounded all at once relative to the level of the above-mentioned filler in the pellets (II) but compounded dividedly at least in two stages, namely the above-mentioned step (3) and step (4). As a result of such stepwise compounding, the fine particles of the above-mentioned filler can be thoroughly mixed and uniformly distributed in the above-mentioned fluororesin and the above-mentioned diluent resin.

The level of addition of the above-mentioned diluent resin is adjusted so that the above-mentioned filler may amount to a desired concentration in the resulting resin composition. Preferably, the above-mentioned diluent resin is added in an amount such that the weight ratio of the above-mentioned pellets (I):the above-mentioned diluent resin is 1:2 to 1:7. When the above-mentioned weight ratio of the diluent resin is 1:(less than 2), the uniformity in distribution of the filler in the resulting resin composition may deteriorate in some instances. When the above-mentioned weight ratio is 1:(higher than 7), the level of the above-mentioned filler in the above-mentioned resin composition may lower, the dispersibility of the filler may become poor, and such mechanical strength characteristics, such as tensile strength, rigidity and hardness may decrease in certain cases.

Considering the level of addition of the above-mentioned diluent resin, the above-mentioned filler is incorporated in the above-mentioned step (2) in an adequate amount so that it may preferably amount to 0.1 to 30% by weight of the above-mentioned resin composition. The concentration of the filler in the pellets (I) is of course higher than that in the pellets (II).

The shearing force $S_2$ should be not weaker than the shearing force $S_1$. The above-mentioned shearing force $S_2$ is thus set at a level equal to or higher than that of the above-mentioned shearing force $S_1$. For preventing the fine particles of the filler from agglomerating and making it easy for the filler (X) in the resin composition according to the present invention to readily have a d99 value within the above-specified range, the shearing force $S_2$ should preferably be stronger than the shearing force $S_1$.

The resin composition producing method of the present invention makes it possible to disperse the fine particles of the filler uniformly in the resin composition by selecting the shearing force to be applied first at a lower level of the shearing forces applied in the conventional methods.

The above-mentioned shearing force $S_2$ can be adjusted in the same manner as mentioned above for the shearing force $S_1$ so that it may be not weaker than the shearing force $S_1$.

As the method of increasing the shearing force $S_2$ to relatively high level by using a twin-screw extruder, there may be mentioned, among others, the method comprising increasing the extrusion amount and the method comprising increasing the screw revolution speed. The shearing force $S_2$ can also be increased by reducing the extrusion temperature in the twin-screw extruder; this is due to the fact that, when the extrusion temperature is lowered according to the viscosity of the fluororesin in its molten state, the melt viscosity of the fluororesin increases.

The shearing force $S_2$ can also be controlled by modifying the screw segment constitution in the twin-screw extruder. For example, it can be increased by increasing kneading disks. Furthermore, the shearing force $S_2$ can further be increased by combinedly using a variety of kneading disks.

In the resin composition producing method according to the present invention, the pellets (II) may further be subjected to grinding or the like by any of the conventional methods to give a powder, or may be rendered uniform in particle size by classification, for instance, as desired. Thus, the resin composition obtained by the resin composition producing method of the present invention may have an arbitrary form, for example the form of pellets or a powder. Generally, the pellets (II) can be used as such in forming foamed moldings, as mentioned later herein.

The additive(s) and other component(s) already described hereinabove that can be contained in the resin composition according to the present invention can be added in the step (2), step (3) and/or step (4), or in some other step(s), for example, in the step of grinding the pellets (II), in the resin composition producing process according to the present invention according to the respective properties of the components or other factors.

The above-described resin composition producing method of the present invention can preferably be applied when the above-mentioned filler is a nucleating agent for foaming.

The resin composition producing method according to the present invention is a method of producing the above-mentioned resin composition according to the present invention, which comprises (1) a step of grinding and/or classifying a nucleating agent for foaming, (2) a step of preparing a mixture from the nucleating agent for foaming and a fluororesin, (3) a step of kneading the mixture under applying a shearing force $S_1$, to thereby give pellets (I), and (4) a step of kneading the pellets (I) and a diluent resin under applying a shearing force $S_2$ to thereby give pellets (II), said shearing force $S_2$ being not weaker than the shearing force $S_1$.

The above-mentioned grinding is preferably carried out until the average particle diameter of the nucleating agent for forming becomes 5 μm or smaller. When the grinding is conducted down to 3 μm or smaller, the resin composition according to the present invention is prepared relatively easy in certain instances. On the other hand, even when an average particle diameter smaller than 1 μm is obtained by grinding the nucleating agent for foaming, no remarkable effect can be confirmed on the difficulty in commercial practice. A more preferred lower limit to the average particle diameter of the nucleating agent for foaming after grinding is 1 μm, and a more preferred higher limit is 3 μm.

The above grinding is preferably performed by such a method as to give, to the resulting nucleating agent for foaming, an average particle diameter within the above range. More specifically, it is carried out while properly selecting the grinding machine and/or grinding conditions. Usable as the grinding machine are, for example, jet mills, hammer mills, ball mills, and pin mills. The nucleating agent for foaming having an average particle diameter within the above range can also be prepared by classification.

In the above-mentioned step (2), a mixture is prepared from the nucleating agent for foaming obtained in the above-mentioned step (1) and a fluororesin. In the above-mentioned step (2), the nucleating agent for foaming and the fluororesin are premixed prior to pelletization in the succeeding step (3).

The above-mentioned fluororesin is the one already described hereinabove as the fluororesin to be used as a starting material in the resin composition producing method of the present invention and to derive to the above-mentioned fluororesin (A) in the resin composition according to the present invention.

The method of mixing for obtaining the above-mentioned mixture may be, for example, any of the methods known in the art. Since, however, the nucleating agent for foaming to be subjected to mixing is prepared in the above step (1) in the form of fine particles relatively small in average particle diameter, hence relatively large in surface area and therefore shows a general tendency toward agglomeration, a mixing method which hardly causes agglomeration of the nucleating agent for foaming is preferred.

When such mixing is attempted by placing the nucleating agent for foaming and the fluororesin in a container, such as a polyethylene bag, and shaking the whole, as disclosed in Japanese Kokai Publication Hei-10-45931, for instance, the above-mentioned nucleating agent for foaming in the resulting mixture will contain coarse particles relatively large in the particle diameter, for example with a d99 value exceeding 15 μm, due to the tendency of the nucleating agent for foaming toward agglomeration, resulting in lack of uniformity in distribution and in unsatisfactory mixing. Such mixture makes it difficult to obtain foamed moldings with fine foam cells uniformly distributed therein, hence is not preferred.

As the above-mentioned method of mixing in the practice of the present invention, there may be mentioned the method comprising using a Henschel mixer, ribbon mixer, V blender, ball mill or the like. For inhibiting the nucleating agent for foaming from agglomerating to thereby prevent coarse particles relatively large in the particle diameter from being contained and to improve the uniformity in distribution, a method involving mechanical stirring, for example the use of a Henschel mixer, is preferred.

In the above-mentioned step (3), pellets (I) are obtained by kneading the mixture obtained in the above-mentioned step (2) under applying a shearing force $S_1$.

The pellets (I) are sometimes called masterbatch pellets.

The method of kneading under the shearing force $S_1$ is not particularly restricted but, generally, the kneading can be conducted by the method comprising using a melt kneader known in the art, for example a single-screw extruder or a twin-screw extruder.

The shearing force $S_1$ can be adjusted by the use of an appropriate melt kneader and by selecting operation conditions such as kneading temperature and number of revolutions. When a twin-screw extruder is used, for instance, the shearing force $S_1$ can be adjusted by adjusting the extrusion temperature, the extrusion amount, and the screw revolution speed, among others, or selecting an appropriate screw segment constitution.

In the above-mentioned step (4), both the pellets (I) obtained in the above-mentioned step (3) and a diluent resin are kneaded up under applying a shearing force $S_2$ to thereby give pellets (II).

The pellets (II) are sometimes called premix pellets.

In the present specification, the term "diluent resin" means a melt-processable resin not containing the nucleating agent (B) for foaming. The above-mentioned diluent resin is preferably one of the fluororesin mentioned above or some other thermoplastic resin. It may be the same fluororesin to be used in the above-mentioned step (2) or a fluororesin different therefrom. As the other thermoplastic resin, there may be mentioned, for example, the same ones as those other thermoplastic resins described already as the ones which can be contained in the resin composition according to the present invention. The same fluororesin as the one used in the step (2) is preferred as the above-mentioned diluent resin.

In attaining the total level of the above-mentioned fluororesin and the above-mentioned diluent resin in the pellets (II), they are not compounded all at once relative to the level of the nucleating agent for foaming in the pellets (II) but compounded dividedly at least in two stages, namely the above-mentioned step (3) and step (4). As a result of such stepwise compounding, the fine particles of the nucleating agent for foaming can be thoroughly mixed and uniformly distributed in the above-mentioned fluororesin and the above-mentioned diluent resin.

The level of addition of the above-mentioned diluent resin is adjusted so that the nucleating agent for foaming may amount to a desired concentration in the resulting resin composition. Preferably, the diluent resin is added in an amount such that the weight ratio of the pellets (I):diluent resin is 1:2 to 1:7. When the above-mentioned weight ratio of the diluent resin is 1:(less than 2), the uniformity in distribution of the nucleating agent for foaming in the resulting resin composition may deteriorate in some instances. When the above-mentioned weight ratio is 1:(higher than 7), the level of the nucleating agent for foaming in the above-mentioned resin composition may lower, the foam cells in the foamed moldings obtained from the resulting resin composition may fail to fine sufficiently, and characteristics as the foamed moldings such as the decrease in permittivity may be poor in certain instances, and the dispersibility of the nucleating agent for foaming may become poor in some instances.

Considering the level of addition of the above-mentioned diluent resin, the nucleating agent for foaming is incorporated in the step (2) in an adequate amount so that it may amount to 0.1 to 2% by weight of the above-mentioned resin composition. The nucleating agent for foaming in the pellets (I) is of course present in a concentration higher than that in the pellets (II).

The shearing force $S_2$ should be not weaker than the shearing force $S_1$. The shearing force $S_2$ is thus set at a level equal to or higher than that of the above-mentioned shearing force $S_1$. For preventing the fine particles of the nucleating agent for foaming from agglomerating and making it easy for the nucleating agent (B) for foaming in the resin composition according to the present invention to readily have a d99 value within the above-specified range, the shearing force $S_2$ is preferably stronger than the shearing force $S_1$.

Meanwhile, the method is in conventional use in the art which comprises applying a shearing force $S_a$ to a mixture composed of a resin and an ordinary filler, such as an inorganic matter, e.g. a nucleating agent for foaming and/or a filler material to thereby give pellets (masterbatch pellets), adding a resin free from an ordinary filler, such as mentioned above, to the pellets and pelletizing the resulting mixture by applying a shearing force $S_b$. On that occasion, the shearing force $S_a$ is generally set at a level higher than that of the shearing force $S_b$ so that the ordinary filler and the resin may be thoroughly mixed up. However, when the conventional method mentioned above is applied, the particles of the filler or nucleating agent for foaming or the like are rather allowed to agglomerate by applying such shearing force $S_a$, whereby the fine particles of the filler or nucleating agent for foaming or the like are inhibited from being uniformly distributed in the resin.

The resin composition producing method of the present invention makes it possible to disperse the fine particles of the nucleating agent for foaming uniformly in the resin composition by selecting the shearing force to be applied first at a lower level of the shearing forces in the conventional methods.

The shearing force $S_2$ can be adjusted in the same manner as mentioned above for the shearing force $S_1$ so that it may be not weaker than the shearing force $S_1$.

As the method of increasing the shearing force $S_2$ to a relatively high level using a twin-screw extruder, there may be mentioned, among others, the method comprising increasing the extrusion amount and the method comprising increasing the screw revolution speed. The shearing force $S_2$ can also be increased by reducing the extrusion temperature in the twin-screw extruder; this is due to the fact that, according to the viscosity of the fluororesin in its molten state, the melt viscosity of the fluororesin increases when the extrusion temperature is lowered.

The shearing force $S_2$ can also be controlled by modifying the screw segment constitution in the twin-screw extruder. For example, it can be increased by increasing kneading disks. Furthermore, the shearing force $S_2$ can further be increased by combinedly using a variety of kneading disks.

In the resin composition producing method according to the present invention, the pellets (II) may further be subjected to grinding or the like by any of the conventional methods to give a powder, or may be rendered uniform in particle size by classification, for instance, as desired. Thus, the resin composition obtainable by the resin composition producing method of the present invention may have an arbitrary form, for example the form of pellets or a powder. However, it may have a form of the pellets (II) for forming foamed moldings as mentioned later herein.

The additive(s) and other component(s) already described hereinabove that can be contained in the resin composition according to the present invention can be added in the step (2), the step (3) and/or the step (4), or in some other step(s), for example, in the step of grinding the pellets (II), in the resin composition producing process according to the present invention according to the respective properties of the resin components or other factors.

Such resin composition of the present invention is allowed to be used in producing foamed moldings.

The above-mentioned method of producing the foamed moldings is not particularly restricted but may be, for example, one of the methods known in the art. Thus, there may be mentioned, for example, the method comprising using a gas soluble in the fluororesin (A) in a molten state (molten resin), charging a screw extruder designed for foaming processes with the resin composition according to the present invention, and performing a continuous gassing injection molding operation.

Usable as the gas mentioned above are, for example, such gases as chlorodifluoromethane, nitrogen and carbon dioxide, and mixtures thereof. The gas may be introduced as a gas under pressure into the molten resin in the extruder, or a chemical blowing agent may be admixed with the molten resin to cause gas generation. The gas is dissolved in the molten resin in the extruder.

When the pressure of the melt suddenly falls upon at leaving the extrusion die, the gas dissolved in the molten resin is released from the melt and, on that occasion, fine foam cells are formed from origins occurred by the nucleating agent (B) for foaming distributed in the melt. The extrudate extruded from the extruder is then cooled for solidification by introduction into water or by other means, whereupon growing foam cells in the foamed moldings is stopped.

The foamed molding obtained contains foam cells and the solid resulting from melting and solidification of the resin composition according to the present invention, and in which the foam cells have a fine shape with an average diameter of 10 to 40 μm, and are uniformly distributed in the above-mentioned solid resulting from melting and solidification. As mentioned hereinabove, such a foamed molding structure is a result of the fact that the nucleating agent (B) for foaming in the resin composition according to the present invention is free of coarse particles relatively large in the particle diameter and is uniformly distributed therein.

The above-mentioned foamed molding, which has the above-described structure, is low in permittivity, shows a stable capacitance value, is lightweight and, it can have a stable shape with respect to wire diameter, thickness and so forth as the moldings aftermentioned. The total volume of foam cells in the above-mentioned foamed molding can be adequately adjusted according to the intended use thereof by adjusting the gas feeding level in the extruder or by selecting the gas species to be dissolved, for instance.

Upon extrusion from the extruder, the above-mentioned foamed moldings can be obtained as a moldings molded according to the intended use thereof. The method of molding is not particularly restricted but may be any of heat/melt molding methods, for example extrusion foam molding, injection foam molding, or mold foam molding.

The shape of the above molding is not particularly restricted but includes, among others, covering materials such as foam-insulated electric wires; filaments forms such as wires or the like; sheet forms: film forms; rod forms; pipe forms and so forth. The above-mentioned moldings can be used, for example, as electrical insulating materials; heat insulating materials; acoustic materials: floats and other lightweight structures; cushions and other shock absorbers.

In particular, the above-mentioned molding is suited for use as a covering material of a foam-insulated electric wire. The foam-insulated electric wire comprises a conductive wire and a covering material covering with this, including cables for connecting computers and peripheral devices, for example LAN cables. Generally, the foam-insulated electric wires can be obtained by molding in a manner such that the conducting wires are covered with the extrudate in an operation of extrusion from the extruder.

The resin composition according to the present invention has a d99 value of not more than 15 μm, hence is free of coarse particles relatively large in the particle diameter as the nucleating agent (B) for foaming, so that the foamed moldings formed from the resin composition can have a structure such that fine foam cells are uniformly distributed therein. The foamed moldings having such a structure can be obtained as moldings low in permittivity and having a shape constant in wire diameter, thickness, etc. Therefore, the resin composition according to the present invention can be judiciously used in forming foamed moldings such as covering materials for a foam-insulated electric wire.

The foamed moldings obtainable from the above-mentioned resin composition also constitute an aspect of the present invention.

The foam-insulated electric wires comprising the above-mentioned resin composition also constitute an aspect of the present invention.

The resin composition producing method of the present invention can mix fine particles of a nucleating agent for foaming uniformly in the above-mentioned resin composition without allowing the fine particles of a nucleating agent for foaming to agglomerate since the nucleating agent for foaming is ground to an appropriate particle diameter, a weaker shearing force is applied in the first pelletization and a stronger shearing force is applied in the second pelletization, as mentioned above. As a result, the resulting resin composition can give foamed moldings having fine foam cells uniformly distributed therein.

BEST MODES FOR CARRYING OUT THE PRESENT INVENTION

The following examples illustrate the present invention in further detail. These examples are, however, by no means limitative of the scope of the present invention.

Examples 1 to 4

Preparation of Premix Pellets

Boron nitride (BN, grade SHP-325, average particle diameter 10.3 μm, product of Carborundum) was ground using a jet mill to give pulverized BN with an average particle size of 2 μm. This pulverized BN was incorporated in an FEP powder (melting point 255° C., melt flow rate (MFR): 22 g/10 min) at an addition level of 5% by weight relative to the sum of the FEP powder and pulverized BN, and the mixture was agitated in a Henschel mixer (FM75E, product of Mitsui Mining) at 1,640 rpm for 10 minutes. Thus-obtained mixed powder was molded into masterbatch pellets using a twin-screw extruder. Then, pellets prepared from the same FEP powder as mentioned above (diluent resin, melting point 255° C., MFR; 23 g/10 min) were added to those masterbatch pellets in a proportion such that the BN concentration in the premix pellets to be prepared might amount to 0.75% by weight, followed by dry blending. Premix pellets were produced from the resulting mixture by twin-screw extrusion with a shearing force equal to or stronger than that used in preparing the masterbatch pellets, as shown in Table 2. The temperature conditions of the twin-screw extruder used are shown in Table 1, and the extrusion conditions in Table 2.

TABLE 1

| Cylinder | | | | | | Adapter | Die |
| --- | --- | --- | --- | --- | --- | --- | --- |
| C1 | C2 | C3 | C4 | C5 | C6 | AD | D |
| 220 | 260 | 280 | 280 | 280 | 280 | 280 | 280 |

(unit: ° C.)

The average particle diameters of BN before and after grinding were determined using a HELOS & RODOS laser diffraction particle size distribution measurement apparatus (product of Nippon Denshi). A dry dispersion unit was mounted, and measurements were carried out at a focal length of 100 mm and a dispersion pressure of 0.1 MPa. The value corresponding to the point where the volume distribution function amounted to 50% was recorded as the average particle diameter.

The melting point of the resin was determined using the model RDC 220 (product of Seiko Denshi). The temperature was raised at a rate of 10° C./minute, and the peak top value was recorded as the melting point of the resin.

The MFR of the resin was determined using the MELT INDEXER H TYPE C-5059D2-1 (product of Toyo Seiki) at 372° C. under a load of 5 kg and the thus-obtained value was reported.

(Evaluation)

The nucleating agent for foaming (BN) in the premix pellets obtained in the above manner was evaluated by the methods described below. The results are shown in Table 2.

1. Particle Size Measurements (d50 and d99) of BN in the Premix Pellets

The premix pellet specimens were sliced using a standard rotary microtome HM330 (product of MICROM) to give specimens with a thickness of 10 μm. From these specimens, images were obtained at a magnification of 3,000 using a high precision digital microscope VH-6300 (product of KEYENCE).

These images were subjected to image processing, the particle size data for the nucleating agent for foaming and the areas for the respective particle diameters were determined, and a histogram was constructed with the particle diameter on the abscissa and the area proportion of the nucleating agent particles having that particle diameter on the ordinate. Due to the limit of measurement at this magnification, only those particles of the nucleating agent for foaming which were 0.4 μm or larger in diameter were used for dotting along the histogram abscissa denoting the particle diameter. The specimen from 0.4 to 1 μm was divided at 0.2-μm intervals, the specimen from 1 to 10 μm at 1-μm intervals, and the specimen from 10 to 100 μm at 10-μm intervals. The particle diameters corresponding to the points on this histogram at which the distribution function amounted to 50% and 99%, respectively, were recorded as the d50 and d99 values, respectively.

2. Variation Measurement of the Nucleating Agent for Foaming

Using a standard rotary microtome HM330 (product of MICROM), 200 premix pellets were sliced to give specimens with a thickness of 10 μm, which were photographed with a digital microscope VH-6300 (product of KEYENCE). The photos at a magnification of 3,000 were subjected to image processing, the areas, per a unit area, occupied by the nucleating agent were thus measured, and the variation was calculated according to the following formula:

$$\text{var.} = \frac{\sqrt{\sum_{\lambda=1}^{n}(x\lambda - \mu)^2/(n-1)}}{\mu} \times 100(\%)$$

Comparative Example 1

Premix pellets were prepared by the same method as used in Example 1 except that the shearing force in the twin-screw extruder in premix pellet preparation was weaker than that in masterbatch pellet preparation. The extrusion conditions used for obtaining the premix pellets and the results of evaluation of the premix pellets obtained are shown in Table 2.

Comparative Example 2

Premix pellets were prepared by the same method as used in Example 1 except that the pulverized BN and FEP powder were mixed up by manual shaking in a polyethylene bag but without using the Henschel mixer. The extrusion conditions used for obtaining the premix pellets and the results of evaluation of the premix pellets obtained are shown in Table 2.

Comparative Example 3

Premix pellets were prepared by the same method as used in Example 1 except that the BN (grade SHP-325, product of Carborundum) was not pulverized. The extrusion conditions used for obtaining the premix pellets and the results of evaluation of the premix pellets obtained are shown in Table 2.

Example 5

Premix pellets were prepared by the same method as used in Example 1 except that Showa Denko's BN grade UHP-1 (average particle diameter 10.5 μm) was used as the BN. The extrusion conditions used for obtaining the premix pellets and the results of evaluation of the premix pellets obtained are shown in Table 2.

Example 6

Premix pellets were prepared by the same method as used in Example 1 except that the BN was ground to attain an average particle diameter of 4 μm. The extrusion conditions used for obtaining the premix pellets and the results of evaluation of the premix pellets obtained are shown in Table 2.

TABLE 2

| | Screw | | | BN | | |
|---|---|---|---|---|---|---|
| | Speed (rpm) | Constitution[1] | Shearing force[2] | d50 (μm) | d99 (μm) | Variation (%) |
| Masterbatch | 100 | RRRRNL | — | Not measured | Not measured | Not measured |
| Example 1 | 100 | RRRNLNL | Strong | 1.8 | 6.5 | 7 |
| Example 2 | 200 | RRRNLNL | Strong | 1.8 | 5.9 | 5 |
| Example 3 | 100 | RRRRNL | Equal | 2.1 | 7.6 | 9 |
| Example 4 | 200 | RRRRNL | Strong | 2.0 | 7.3 | 8 |
| Example 5 | 100 | RRRNLNL | Strong | 1.9 | 6.7 | 7 |
| Example 6 | 100 | RRRNLNL | Strong | 3.7 | 9.7 | 9 |
| Comparative Example 1 | 100 | RRRRRL | Weak | 4.2 | 15.6 | 16 |

TABLE 2-continued

| | Screw | | | BN | | |
|---|---|---|---|---|---|---|
| | Speed (rpm) | Constitution[1] | Shearing force[2] | d50 (μm) | d99 (μm) | Variation (%) |
| Comparative Example 2 | 100 | RRRNLNL | Strong | 7.6 | 20.3 | 22 |
| Comparative Example 3 | 100 | RRRNLNL | Strong | 10.7 | 50.6 | 27 |

[1] Screw constitution in the kneading zone is shown.
R: Forward feeding kneading disks
L: Backward feeding kneading disks
N: Kneading disks having no feeding effect
[2] The shearing force is shown in comparison with the shearing force in masterbatch preparation.

From Table 2, it was revealed that, in each of Examples 1 to 6, the BN in the premix pellets had a d99 value less than 10 μm and the variation in area of BN per a unit area of the cut surface was as small as 10% whereas, in Comparative Example 1 in which a stronger shearing force was followed by a weaker shearing force, the d99 value was above 15 μm and the dispersibility was thus poor. In Comparative Example 1, reagglomeration of BN presumably occurred in the process of premix pellet production. From Table 2, it was also revealed that, in Comparative Example 2 in which the pulverized BN and FEP powder were mixed up by manual shaking, the BN in the premix pellets showed a d99 value exceeding 20 μm and was fairly poor in dispersibility as well. In Comparative Example 2, the premixing of the pulverized BN with the FEP powder was presumably insufficient, hence reagglomeration of BN was allowed to occur in the step of pelletization.

Example 7

Foam-insulated electric wire production was carried out using the premix pellets prepared in Examples 1 to 6 and Comparative Examples 1 to 3. The equipment and molding conditions are shown in Table 3.

TABLE 3

| Extruder | Cylinder diameter | 50 mm |
|---|---|---|
| | Screw L/D | 33 |
| | Die/tip/land | 3.0 mm/1.5 mm/7.0 mm |
| Temperature conditions | C1 | 350° C. |
| | C2 | 370° C. |
| | C3 | 370° C. |
| | C4 | 370° C. |
| | C5 | 370° C. |
| | Adapter | 360° C. |
| | Head | 330° C. |
| | Die | 310° C. |
| Extrusion conditions | Screw speed | 11 rpm |
| | Gas flow rate | 25 ml/min |
| | Resin pressure | 16 MPa |
| | Resin temperature | 330° C. |
| | Cone length | 20 mm |
| | Core wire size | 0.5 mm φ |
| | Covering speed | 130 m/min |

The foam-insulated electric wires obtained were subjected to the following measurements. The results are shown in Table 4.

1. Average Foam Cell Diameter

A SEM image was taken of each wire cross section and subjected to image processing. The diameters of respective foam cells were thus calculated, and the average foam cell diameter was determined by arithmetic mean calculation.

2. Wire Outside Diameter

Electric wire outside diameter measurements were carried out using the LASER MICRO DIAMETER LDM-303H-XY (product of Takikawa Engineering) In Table 4, ± indicates the maximum and minimum values.

3. Capacitance

Capacitance measurements were carried out using the apparatus CAPAC 300 19C (product of Zumbach). In Table 4, ± indicates the maximum and minimum values.

TABLE 4

| | Average bubble diameter (μm) | Wire outside diameter (mm) | Capacitance (pF/m) |
|---|---|---|---|
| Example 1 | 30 | 0.96 ± 0.01 | 145 ± 2 |
| Example 2 | 28 | 0.95 ± 0.01 | 143 ± 1 |
| Example 3 | 26 | 0.95 ± 0.01 | 144 ± 1 |
| Example 4 | 30 | 0.96 ± 0.01 | 147 ± 2 |
| Example 5 | 29 | 0.96 ± 0.01 | 145 ± 2 |
| Example 6 | 33 | 0.95 ± 0.02 | 143 ± 2 |
| Comparative Example 1 | 40 | 0.96 ± 0.03 | 145 ± 4 |
| Comparative Example 2 | 45 | 0.96 ± 0.03 | 140 ± 4 |
| Comparative Example 3 | 50 | 0.96 ± 0.04 | 143 ± 6 |

From Table 4, it was revealed that the foam-insulated electric wires obtained in Examples 1 to 6 from the premix pellets containing BN with a d99 value of less than 15 μm and uniformly distributed therein were small in average foam cell diameter and showed good molding stability whereas the foam-insulated electric wires derived from the pellets of Comparative Examples 1 to 3 were great in average foam cell diameter and poor in molding stability.

INDUSTRIAL APPLICABILITY

The resin composition according to the present invention, which has the above-described constitution and can contain the filler (X) low in affinity for a fluororesin and uniformly distributed in the fluororesin and, in particular is free of any coarse particle fraction, relatively large in the particle diameter, of the nucleating agent (B) for foaming, can give foamed moldings with fine foam cells uniformly distributed therein. The resin composition producing method of the present invention has the above-described constitution and can give the above resin composition without causing agglomeration of fine particles of the above-mentioned filler, such as the nucleating agent for foaming.

The invention claimed is:

1. A resin composition comprising a fluororesin (A) and a nucleating agent (B) for foaming, wherein said nucleating agent (B) for foaming has a d99 value of not more than 15 μm in the state of distribution in the resin composition.

2. The resin composition according to claim 1, wherein the d99 value is not more than 10 μm.

3. The resin composition according to claim 1, wherein a variation in areas occupied by the nucleating agent (B) for foaming per a unit area in an arbitrary section is not more than 15%.

4. The resin composition according to claim 1, wherein the nucleating agent (B) for foaming is boron nitride.

5. The resin composition according to claim 1, wherein the nucleating agent (B) for foaming amounts to 0.1 to 2% by weight of the resin composition.

* * * * *